US009784019B2

(12) United States Patent
Avganim

(10) Patent No.: US 9,784,019 B2
(45) Date of Patent: Oct. 10, 2017

(54) LOW PROFILE COMPUTER SECURITY LOCKS

(71) Applicant: Meir Avganim, Gealya (IL)

(72) Inventor: Meir Avganim, Gealya (IL)

( * ) Notice: Subject to any disclaimer, the term of this patent is extended or adjusted under 35 U.S.C. 154(b) by 0 days.

(21) Appl. No.: 15/151,104

(22) Filed: May 10, 2016

(65) Prior Publication Data
US 2016/0333613 A1     Nov. 17, 2016

Related U.S. Application Data

(60) Provisional application No. 62/160,229, filed on May 12, 2015, provisional application No. 62/161,992, filed on May 15, 2015, provisional application No. 62/174,203, filed on Jun. 11, 2015.

(51) Int. Cl.
| | |
|---|---|
| G06F 1/16 | (2006.01) |
| H05K 5/00 | (2006.01) |
| H05K 7/00 | (2006.01) |
| E05B 73/00 | (2006.01) |

(52) U.S. Cl.
CPC ...... *E05B 73/0082* (2013.01); *E05B 73/0005* (2013.01); *G06F 1/1633* (2013.01)

(58) Field of Classification Search
CPC . E05B 73/0082; E05B 73/0005; G06F 1/1633
USPC .......................... 361/679.55, 679.57, 679.58
See application file for complete search history.

(56) References Cited

U.S. PATENT DOCUMENTS

| | | | |
|---|---|---|---|
| 6,463,770 B1 | 10/2002 | Lee | |
| 6,578,394 B2* | 6/2003 | Yin | E05B 73/0005 |
| | | | 248/551 |
| 6,788,216 B2* | 9/2004 | Chen | G08B 13/1436 |
| | | | 340/566 |
| 8,833,117 B2* | 9/2014 | Yang | E05B 37/025 |
| | | | 70/14 |
| 9,062,476 B2* | 6/2015 | Kao | E05B 73/00 |
| 2003/0089147 A1 | 5/2003 | Yang | |

(Continued)

OTHER PUBLICATIONS

International Search Report dated Aug. 14, 2016 issued in connection with corresponding PCT/IB2016/052706.

*Primary Examiner* — Anthony Haughton
(74) *Attorney, Agent, or Firm* — Ostrolenk Faber LLP

(57) ABSTRACT

A lock that is configured to be attached to electronic equipment requiring securing against theft and the lock comprising: a lock body; a locking element protruding from the lock body and having a forward distal section that is comparatively wider in cross-sectional size compared to a rear section thereof, the forward section being configured to be insertable into a cavity formed in the equipment, where the cavity is defined by an opening having a size and shape slightly larger than the cross-sectional size of the forward section of the locking element and an interior larger in cross-sectional size than the opening of the cavity; a slidable locking pin configured to slide alongside the locking element and into the cavity, after the locking element has been inserted into said cavity, to substantially fill a space of the cavity left unoccupied by the locking element; a sliding mechanism coupled to the locking pin and configured to slide the locking pin into and out of the cavity; and a locking mechanism to lock the locking mechanism within the lock body to prevent withdrawal of the locking element from the cavity.

15 Claims, 12 Drawing Sheets

(56) References Cited

U.S. PATENT DOCUMENTS

2013/0180295 A1    7/2013  Avganim
2014/0085788 A1*   3/2014  Avganim .............. G06F 1/1656
                                                    361/679.01
2015/0059422 A1*   3/2015  Kao ....................... E05B 73/00
                                                    70/58

* cited by examiner

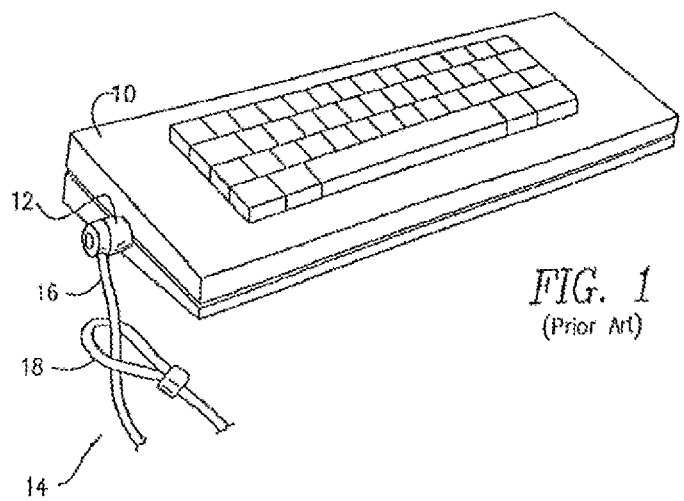
FIG. 1
(Prior Art)
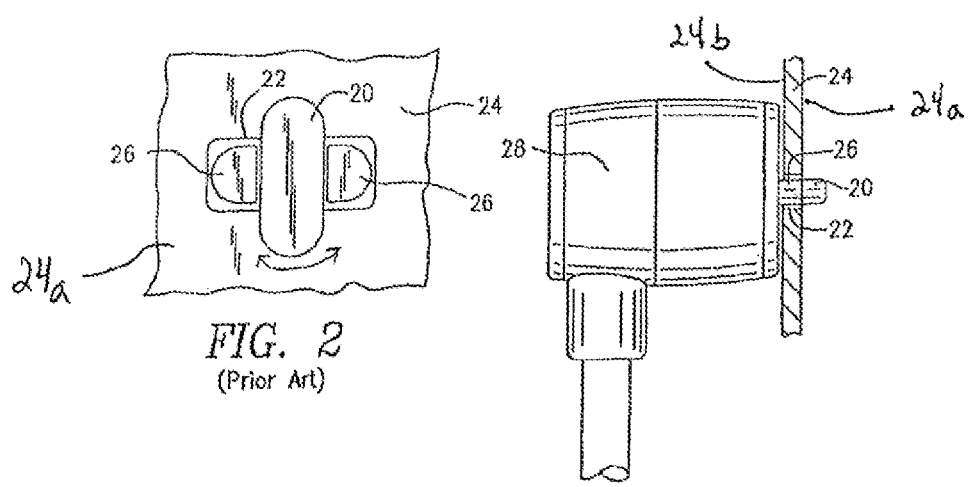
FIG. 2
(Prior Art)
FIG. 3
(Prior Art)

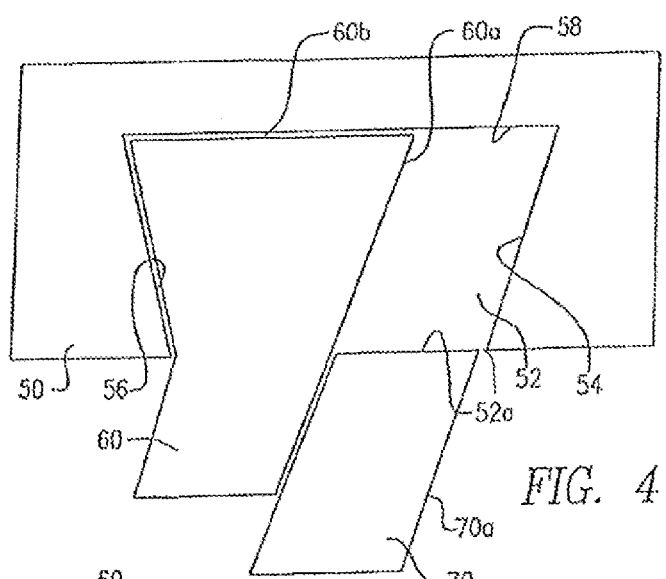
FIG. 4
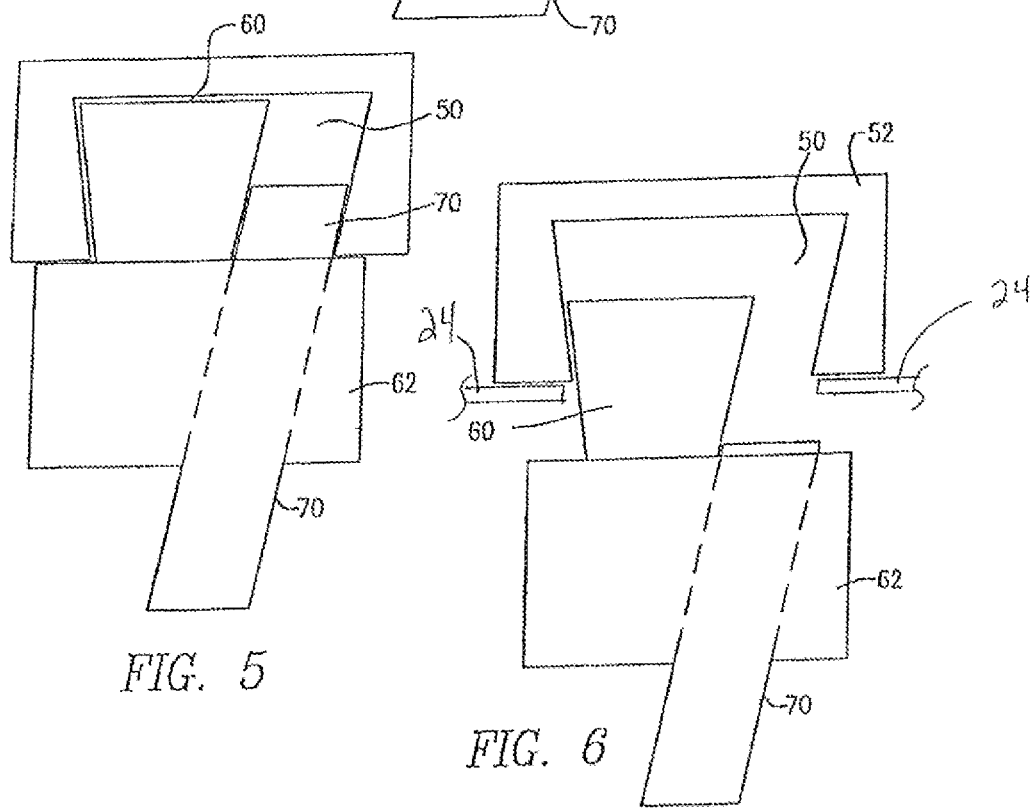
FIG. 5
FIG. 6

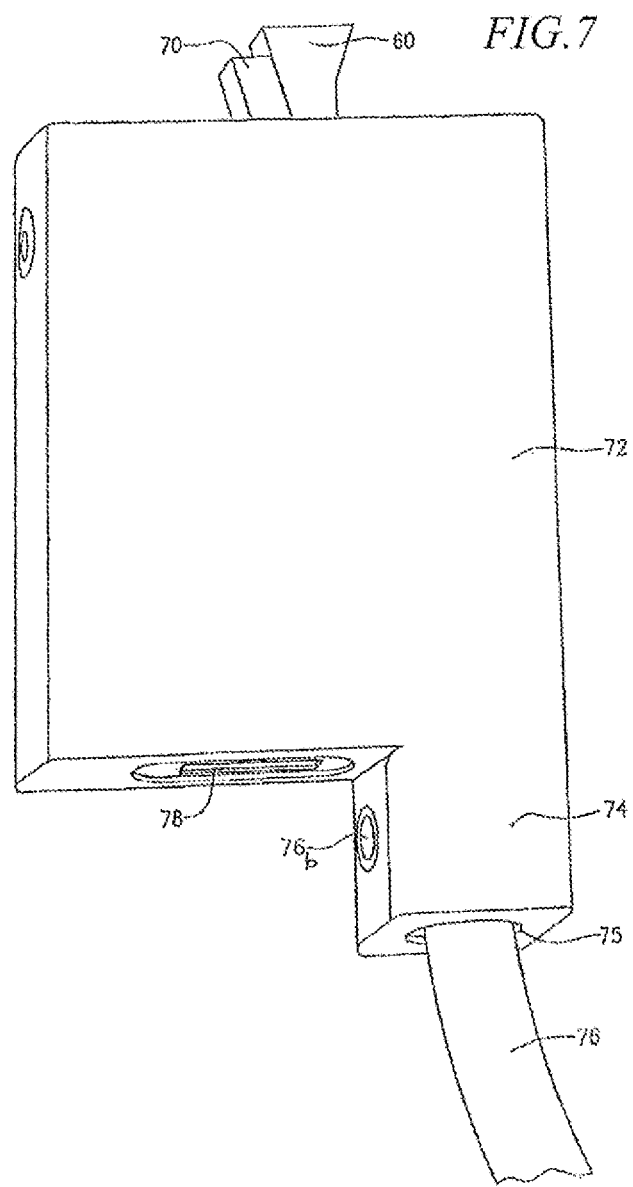

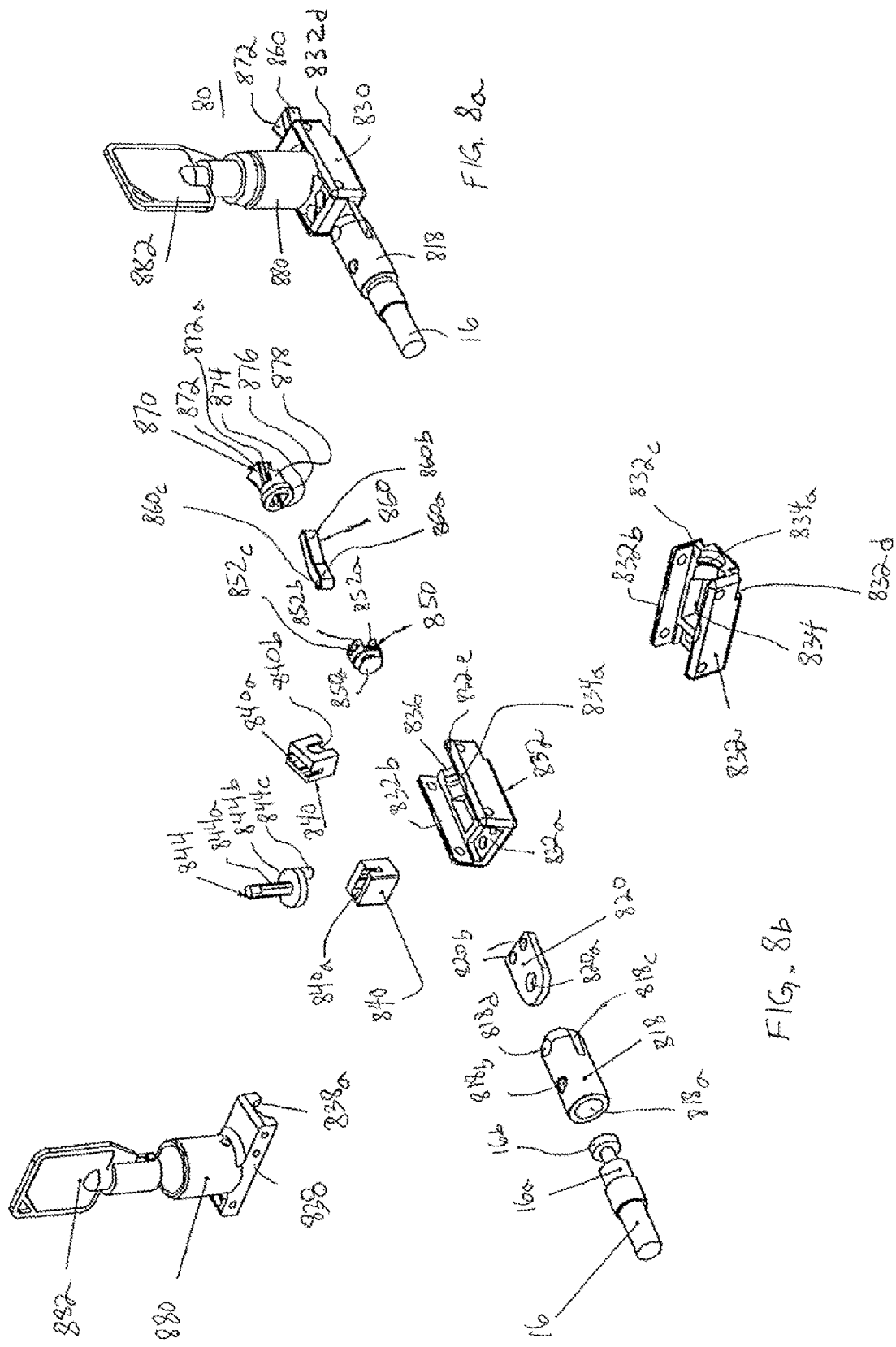

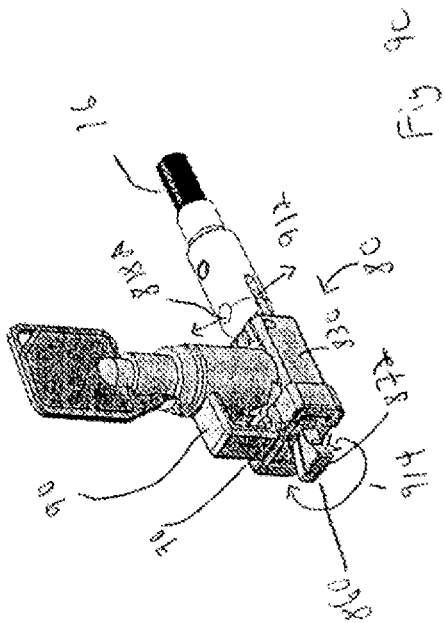
Fig. 9c
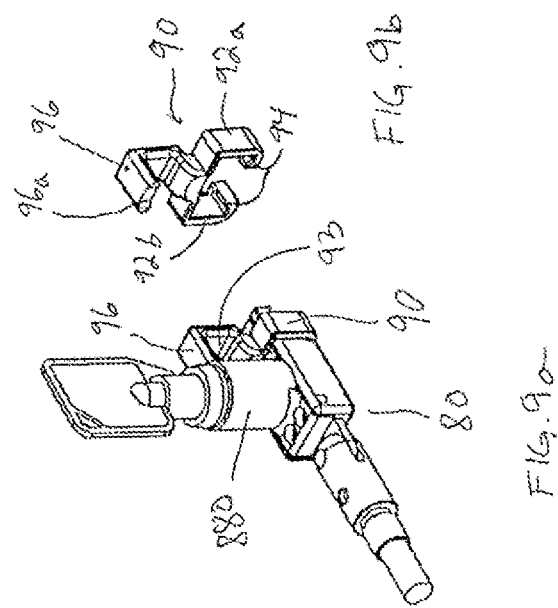
FIG. 9b
FIG. 9a

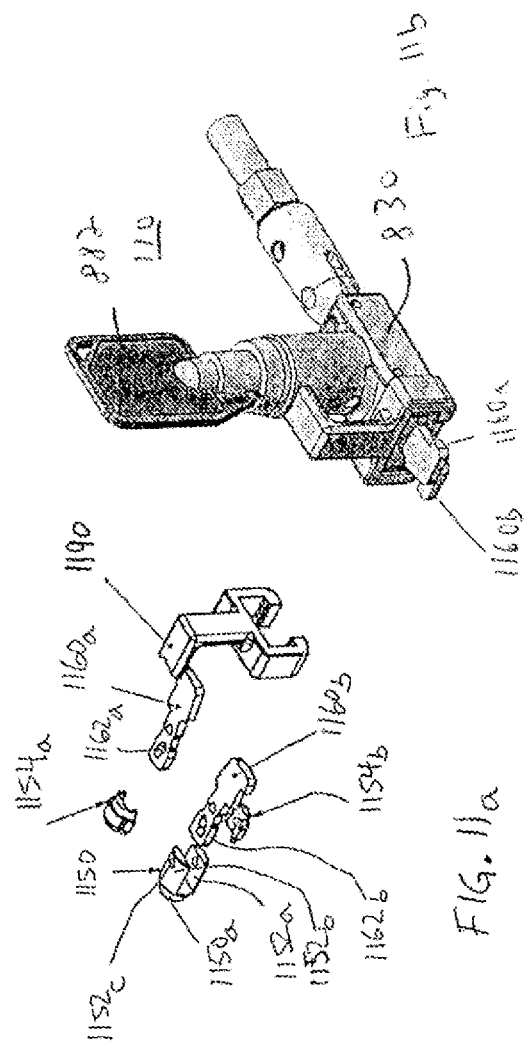

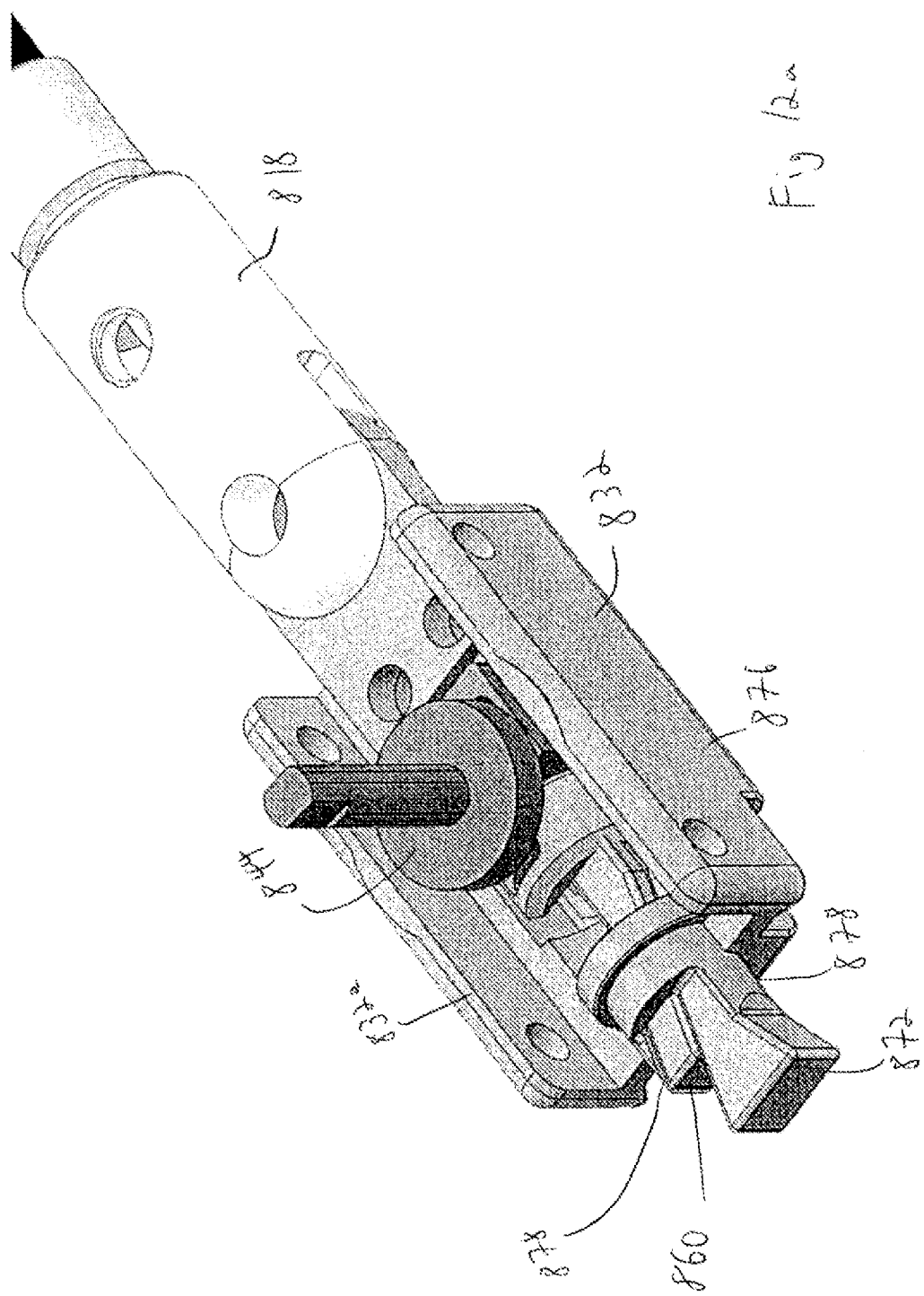

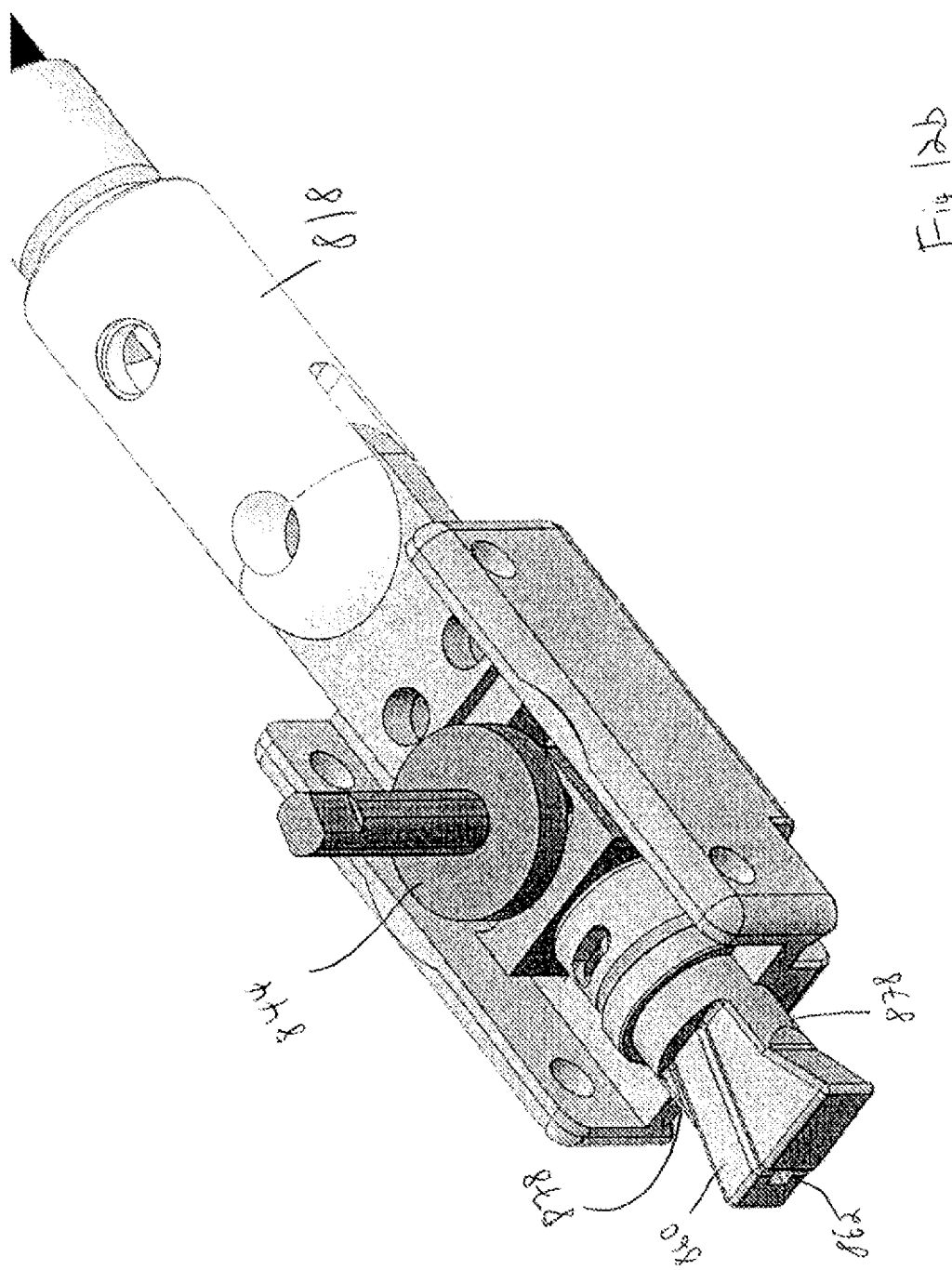

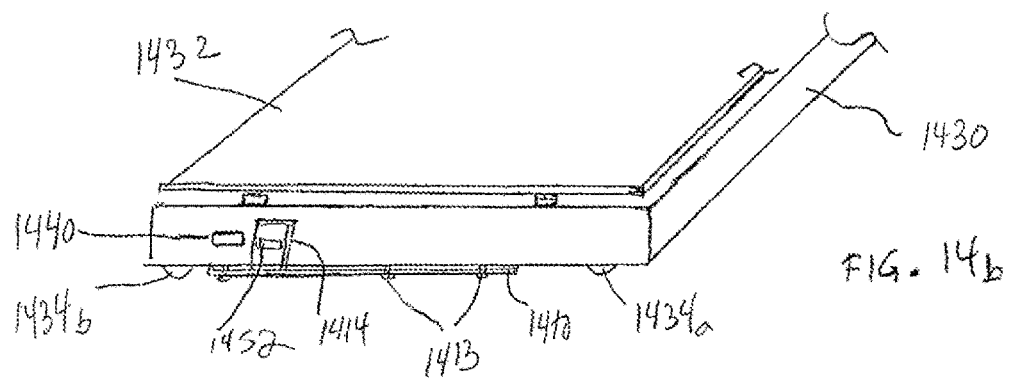
FIG. 14b
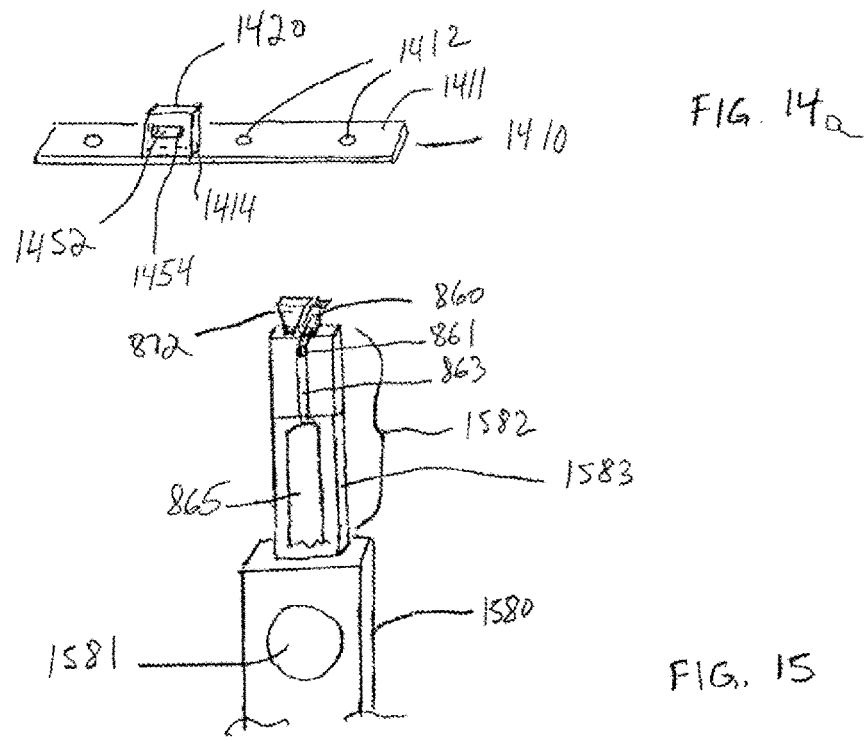
FIG. 14a
FIG. 15

LOW PROFILE COMPUTER SECURITY LOCKS

CROSS-REFERENCE TO RELATED APPLICATION

This application claims priority under 35 U.S.C. §§119 and 172 of U.S. Provisional Application No. 62/160,229, filed May 12, 2015; 62/161,992, filed May 15, 2015; and 62/174,203, filed Jun. 11, 2015, the entire contents of which are hereby incorporated by reference.

BACKGROUND OF THE INVENTION

The present invention relates to devices for inhibiting the theft of relatively small but expensive pieces of equipment such as computers, telephones and the like. More specifically, the present invention is directed to a theft preventing lock for computers, tablets and the like, which has a locking element that is designed to be received in a trapezoidal or conical, security cavity or slot, where the cavity/slot is located very low, close to the surface on which the equipment is resting, e.g. within 3 mm of that surface.

The present invention is also directed to a computer security lock of the type disclosed in U.S. Pat. No. 5,502,989, the contents of which are incorporated fully by reference herein. Prior art FIGS. 1, 2 and 3 herein correspond, respectively, to FIGS. 2, 9 and 13A of the aforementioned U.S. Pat. No. 5,502,989.

In FIG. 1, an electronic computer or a keyboard 10 has a security slot into which is inserted a lock 12 which has a cable assembly 14 with a flexible cable 16 and a loop 18. This type of a lock can be used to attach itself to the keyboard 10 and to be tethered to an immovable object, in well known manner.

The lock 12 has a locking element 20 (FIG. 2) which can be inserted through a rectangular, 3×7 mm security slot 22 that is formed in and through the wall 24 of the keyboard, or tablet, or telephone or any small and expensive object 10. The pins 26 prevent rotation of the lock body relative to the security slot 22, and the locking element is rotated behind the wall 24, bearing against the rear surface 24a of the wall 24.

The cable assembly 14 can be coupled to the lock body with a sleeve 28. The wall 24 of the equipment 10 is formed with the slot 22 (FIG. 3).

The prior art rectangular security slot measuring 3×7 mm and having a rotatable T-bar locking element, e.g., 20, poses issues of complexity, insufficient sturdiness and proneness to breakage in some respects.

Another drawback of the prior art mechanism is that the T-bar locking element 20 needs to rotate behind the wall 24 of the piece of equipment and, as a result, can cause interference with other internal components.

The present invention improves upon the locks described relative to the present inventor's prior development of a novel security cavity or slot that has been referred to as the "trapezoidal slot", and the prior locking heads for that slot, as described for example in the inventor's pending application Ser. No. 14/727,354 and in his U.S. Pat. No. 9,137,911, the full contents of which are incorporated herein.

SUMMARY OF THE INVENTION

It is an object of the present invention to provide electronic equipment security locks which avoid at least some of the disadvantages of the prior art.

Another object of the present invention is to provide a lock which does not necessarily need to have a through-going opening in the body wall of the equipment.

The foregoing and other objects are realized with a locking mechanism which is generally similar to those found in the art, except that the locking element is generally trapezoidal or conical in shape and is designed to fit into a security slot in the equipment that has a narrow opening, which flares outwardly and defines within a trapezoidal or conical chamber for the purpose of securely holding the locking element therewithin.

Preferably, the invention comprises a lock configured to be attached to electronic equipment requiring securing against theft, at a security cavity of said mobile security equipment, the lock includes: a lock body having a housing with a bottom resting surface; a pair of locking elements protruding from the lock housing and shaped to engage said security cavity; said locking elements being disposed at a height of not more than 3.0 mm above said housing bottom resting surface; a sliding mechanism located inside said housing and coupled to at least one of said locking elements and configured to move said at least one of said locking elements into and out of said cavity; and a locking mechanism configured to lock said at least one locking element within said lock body to prevent withdrawal of the at least one locking element from the cavity.

Preferably, the pair of locking elements include: a fixed locking element protruding from the lock body and having a forward distal section that is comparatively wider in cross-sectional size compared to a rear section thereof, said fixed locking element having a cross-sectional size that gradually decreases from said forward distal section toward said rear section thereof, said forward section being configured to be insertable into said cavity, said cavity being partially defined by a pair of opposed cavity walls, and said cavity comprises an opening for insertion therethrough said fixed locking element, said cavity opening having a size and shape larger than a cross-sectional size of said forward section of said fixed locking element and an interior defined by said cavity walls, said interior tapering larger in cross-sectional size beginning at said opening of said cavity; and a slidable wedge bolt configured to slide alongside the fixed locking element and into said cavity, after said fixed locking element has been inserted into said cavity, to substantially fill said interior of said cavity left unoccupied by said fixed locking element, in a manner such that said fixed locking element and said wedge bolt bear against and hold onto said cavity walls.

Preferably, the fixed locking element has a pair of side walls that are angled relative to said rear section of said locking element to form said forward distal section, and the interior of the cavity has a three dimensional trapezoidal shape in cross-section, and the opening into said cavity is rectangular in shape. The lock includes a cable attached to the lock body, and preferably the lock body housing has width, length and height dimensions and the height dimension measures less than 8 mm, the width dimension is less than 12 mm and the length dimension is less than 22 mm.

Preferably, the lock body includes a locking element base in which a proximate end of the fixed locking element is anchored, the fixed locking element base having a circular circumferential edge which is rotatably held in a complementary circular groove formed in the lock body for allowing rotation of the fixed locking element relative to said lock body, and further including an interior passage through which the wedge bolt is slidable. A holder holds the wedge bolt and a proximal end of the wedge bolt is held in the holder. Also included is a retaining pin which holds the proximal end of the wedge bolt in the holder in a manner that allows lateral movement of said proximal end of the wedge bolt in the holder. A coupling mechanically couples the holder to the sliding mechanism.

In another embodiment, the pair of locking elements comprise first and second scissor-head locking elements that are pivotally joined at one end thereof, in a manner that allows the scissor-head locking elements to either overlap each other or spread apart through lateral movement relative to the one end thereof. In another embodiment, the cavity is removeably coupled to the portable electronic equipment via a strip that has a construction in which the cavity is formed. Another embodiment, includes a trap mountable on the housing of the lock body and defining a trap space configured to enable one or more electronic cables to be securely held therein. In a further embodiment, two traps are provided including a first trap mountable on the housing of the lock body and defining a trap space configured to enable one or more electronic cables to be securely held therein, and a second trap integrally formed with the first trap and configured to attach a USB cable securely to the portable electronic equipment.

Other features and advantages of the present invention will become apparent from the following description of the invention which refers to the accompanying drawings.

BRIEF DESCRIPTION OF THE DRAWINGS

FIG. 1 is perspective of a prior art cable locked equipment.

FIG. 2 is a prior art sketch showing a lock with a rotatable T-bar fitted through and extending beyond a rectangular security slot.

FIG. 3 is an enlarged and partially cut away depiction of a portion of the lock of FIG. 1.

FIGS. 4, 5 and 6 diagrammatically illustrate the locking principle of the present invention.

FIG. 7 is a first perspective of a lock embodiment of the present invention.

FIG. 8a is another embodiment of the present invention.

FIG. 8b is an exploded view of FIG. 8a.

FIGS. 9a, 9b and 9c depict a cable trapping accessory for the lock embodiment of FIG. 8a.

FIGS. 11a and 11b show another embodiment of the invention.

FIGS. 12a and 12b show operation details of the lock embodiment of FIG. 8a.

FIGS. 13a, 13b, 13c and 13d illustrate a dual function cable trap for the security lock of FIG. 8a.

FIG. 14a shows a bracket with a security slot for attachment to a mobile device that is not provided with such security slot.

FIG. 14b shows the security slot bracket of FIG. 14a attached to a mobile device.

FIG. 15 shows another embodiment of a security lock featuring a long and thin leading section.

DETAILED DESCRIPTION OF EMBODIMENTS OF THE INVENTION

Figure 6A:
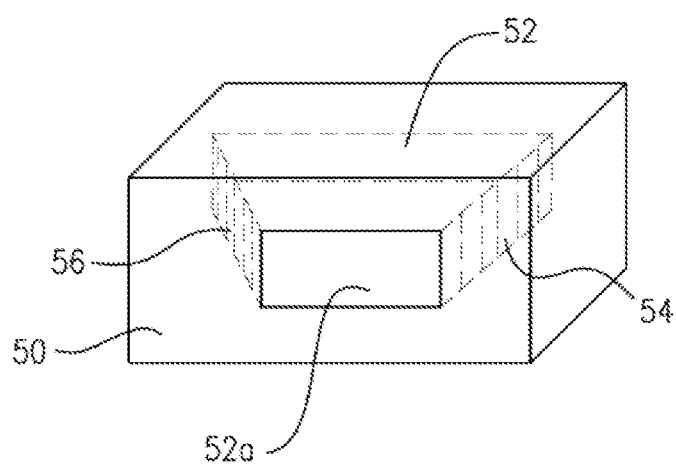
FIG. 6a shows the trapezoidal cavity perspectively.

With reference to FIGS. 4-6, the locking principle of the present invention is described as follows. The body or wall 50 of equipment that needs to be secured against theft has formed therein a blind (or even through-going) cavity 52 with a generally rectangularly shaped opening 52a which has outwardly extending side walls 54 and 56, that taper away from each other and a back wall 58, defining a trapezoidal shaped cavity in a horizontal cross section. That is, the distance between the side walls of the cavity increases, the farther away from the opening.

The complementary shaped locking elements 60 and 70, include the wedge element 60 which has a leading lock body 60a with a leading width 60b approximately equal, but slightly smaller than the width of the opening 52a, e.g. less than 5 mm. Therefore, the locking element 60 can be easily inserted into the cavity 52 and pushed to the left, enabling the slidable locking pin 70 to be pushed into the cavity 52 alongside the element 60, filling the cavity 52 and allowing the right side wall 70a thereof to engage the side wall 54 of the cavity 52.

In this state, it is now impossible to pull on the locking element 60 and retrieve it from the cavity 52. The greater the pulling force, the more force is exerted on the slidable pin 70, pushing it harder against the cavity side wall, which tightens the grasp of the locking mechanism on the cavity side walls, or more precisely, on the block of material that constitutes the wall or body 50 of the equipment. The key to the present invention is that the cavity 52 has an opening which is narrower than the interior size of the cavity, which allows the insertion of a widening body locking element therein and the locking thereof inside the cavity, as diagrammatically illustrated in FIGS. 5 and 6. Preferably, the opening shape is rectangular having a height and a width, and the width dimension is equal or less than 4.5 mm. Thus, in FIG. 5, the locking element is shown to be integral with the locking element body 62 which has a sliding channel formed therein, in which the locking pin 70 is slidable. In FIG. 6, the locking pin 70 is shown partially moved into the cavity 52.

Referring to FIG. 7, in an embodiment reduced to practice, the lock housing 72 houses therewithin a locking mechanism operable to slide the locking pin 70 alongside the locking element 60 and into the aforementioned slot or cavity. The lock housing has a cable holder 74 with an opening for receiving the proximate end of cable 76 to be held and retained in place by a retaining pin 76b. An opening 78 is provided for a key to operate the sliding, locking pin 70.

With the present invention, no mechanism is needed to turn a T-bar or to cause scissor-like prongs to move to the right and to the left, beyond the outer wall 24 and within the mobile device 10 (FIG. 1), as in the prior art. The trapezoidal locking tab 60 is inserted, followed by the slidable locking pin 70, inside the locking cavity 52, which naturally pushes the tab 60 slightly to the left, locking the lock 12 to the piece of equipment 10 and tethering it to an immovable object. The locking pieces 60, 70 fill and do not rotate within the cavity 52. The locking pieces 60, 70 do not project beyond the cavity 52, inside the mobile device 10.

One of the key objectives of the present invention is to disclose an inventive lock that provides a locking function as in FIGS. 4-6, but in an embodiment where the locking elements are situated very close to the surface on which the equipment rests and to provide a lock that is implemented in exceedingly small dimensions, and in a manner that prevents or blocks the ability to twist and break the locking pieces. The further objective is to make it easy for the cable attached to the lock to be positioned in different directions, i.e. to provide flexible positioning of the cable and the lock housing.

Referring to a first such embodiment, there is disclosed in FIG. 8a a lock system 80 with a lock housing 830 that supports the locking elements comprising a fixed wedge head 872 and a movable wedge bolt 860 that correspond, respectively, to the locking elements 60 and 70 in FIG. 7. The lock housing 830 is attached at one rear end thereof, via a cable coupler 818, to the flexible cable 16 (FIG. 1). The key 882 can be turned in one or the other direction to move the wedge bolt 860 in and out of the housing 830, by turning the key inside the lock cylinder 880.

The internal components of the lock system 80 of FIG. 8a are illustrated in greater detail in the exploded view of FIG. 8b, starting with the cable 16 at the left, which cable 16 is terminated in a plug 16a with a steel catching disc 16b that is insertable into the opening 818a of the cable coupler 818 and held therein by a rivet at 818b, which secures the cable 16. The cable coupler 818 is attached to the cable tab 820 via a rivet that passes through 818d and 820a, enabling lateral (left and right) movement relative to the tab 820, which itself is affixed to the rear chamber 832a of the lock house base 832, via rivets or screws in the holes 820b that are registered with corresponding holes in the lock house base 832.

The lock house 830 in FIG. 8a is comprised of the aforementioned lock house base 832 which has sidewalls 832b and 832e that are spaced wide enough to receive between them the lock house cover 838, which rests on the ledges 832c of the lock house base 832 and secured thereto via the indicated rivet holes.

In FIG. 8b, the lock house base 832 is shown twice, oriented in different directions, in order to show additional features. One of those features is the interior chamber 834 which, at the front end of it, features a half circle annular indent 834a that is fully defined by the corresponding feature 838a in the lock housing cover 838. The lock house cover 838 supports the cylindrical locking mechanism 880 that is operated by the key 882, as more fully described below.

Turning to the locking elements and their manners of operation, the rectangular slideable coupler 840 is fitted in the chamber 834 of the base 832 so that its undercut U-shaped front chamber 840b faces to the right in the figure. Its upper lateral groove 840a is positioned to receive the lock driver pin 844c that is connected to the rotatable disc 844b that is turned by the shaft 844a of the lock driver 844 that penetrates into the cylinder housing 880 and is turned by the key 882. Note that the sliding coupler 840 is shown in FIG. 8d twice, so that it can be seen from two sides thereon.

Regardless, it should be immediately apparent that when the shaft 844 is turned, say over an angular range between 0 and 90 degrees, the driver pin 844c will slide inside the groove 840a and push the sliding coupler 840 in the chamber 834, back and forth, imparting a back and forth movement to the wedge bolt 860, as described below.

With further reference to FIG. 8b, the rotatable coupler 850 comprises a rear disc 858 that fits inside the U-shaped chamber or catch 840b, in a manner that fixes it to the coupler 850 but allows it to rotate inside the groove 840b. The front side has upper and lower projections 852b, 852a with a slot 852c, thereby enabling the wedge bolt 860, that comprises a longer section 860b, more forwardly oriented, and a shorter section 860a longitudinally misaligned, to be inserted between the arms 852b, 852a with a bolt/rivet passing through the groove 852c and the bolt opening 860c. Thereby, the wedge bolt 860 can both pivot between the arms 852b, 852a as well as slide inside the opening 852c, for a reason that will become apparent momentarily.

The fixed wedge head 870 is integrally formed with a circular disc 876 that defines an opening 874 (for insertion therethrough of the wedge bolt 860). The disc 876 support for the fixed wedge 870 sits inside and locked within the groove 836 defined by the base and cover housing pieces 832, 838, permitting the fixed wedge head 870 to rotate in place in the housing 830, without moving longitudinally.

Upon being assembled, the wedge bolt 860 slides through the opening 874. It has a groove 862 (FIG. 12b) that fits over a projection 872 on the fixed wedge 872 whereby (referring to FIGS. 12a and 12b), when the key driving coupler 844 is turned to and fro, the wedge bolt 860 is moved between the open position (FIG. 12a) or in the closed position (FIG. 12b). The closed position is also the position shown in FIG. 8a.

Figure 10B:
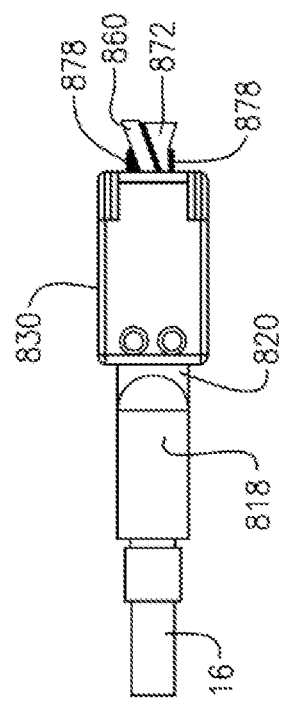
FIGS. 10a and 10b are, respectively, front and bottom views of FIG. 8a, with dimensions indicated.

As shown in FIGS. 12a and 12b, the fixed wedge head 872 and the wedge bolt 860 are bounded by guiding tabs 878. See also FIG. 10b.

With the foregoing in mind, it is immediately apparent that while the lock 80 is operated to the position of 12a, its fixed wedge head 872 can be easily inserted into the trapezoidal cavity 52 (FIGS. 4-6), it being observed that the forward lateral side 60b of the fixed wedge 60 is just slightly smaller than the opening size into the cavity 52. However, upon the fixed wedge 872 being pushed to the left (in FIG. 4), the slideable wedge bolt 860 is operated to slide into the cavity 52, via operation of the key 882. When in that position, pulling on the entire housing 830 (or on the cable) will not dislodge the locking wedges 872, 860 out of the cavity 52. The harder one pulls, the more force is exerted on the side walls of the structure that defines the cavity 52, in a sideways direction where the structure is the strongest and so it will not break or yield.

In fact, if the lock housing 830 is twisted, the wedges 872, 880 will remain solidly within without moving in the cavity 52, and only the housing 830 will rotate, not the locking pieces. Thus, an exceedingly strong locking hold is obtained thereby, which does not place any pressure or breaking forces on any of the smaller and weaker components, such as on the couplers 840 and 850, inside the housing 830.

Thus, when compared to the prior art lock configuration and methodology, which are illustrated in prior art FIGS. 1-3, no stress is placed on the outer thin wall 24 of the equipment 10 and there is no rotatable T-bar tab 20 as in prior art FIG. 2, to stress the thin wall 24 or permit twisting of the anti-rotation pins 26 shown in the prior art Figures.

Figure 10A:
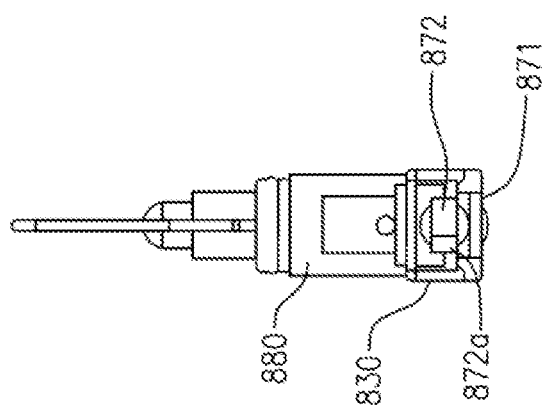

The lock system 80 of FIG. 8a provides a much stronger protection of the equipment 10 against theft and provides it with much greater assurance against being defeated by twisting and turning the lock—and at the same time provides this functionality at a greatly reduced size configuration. More specifically, as can be discerned from FIGS. 10a and 10b, the height of the fixed lock wedge 872 is only 2.45 mm (preferably less than 3.0 mm) above the surface 871 on which the bottom of the housing 830 rests (FIG. 10a). The combined side-to-side extent of the wedges 872 and 860 is 6.20 millimeters and the lateral size of the fixed wedge 872 is under 5 mm, which enables an extremely small opening for the cavity 52 to be provided, of under 5 mm. In a preferred embodiment, the width of the housing 830 is not greater than 12 mm, its overall height less than about 8 mm and its overall length on the order of about 22 mm. Since the locking elements comprising the wedges 872, 860 remain fixed and immovable inside the cavity 52, the sensitive electronic components within the equipment 10 will not be harmed, even if a thief attempts breaking the entire locking mechanism by violent tugging on the lock housing 830.

Referring to FIGS. 9a, 9b and 9c, as an enhancement to the lock 80 (of FIG. 8a), the instant inventor provides a cable trap 90 (FIG. 9b) which has a lower, U-shaped, bottom-opened sleeve comprising side walls 92a, 92b and inwardly pointing fingers 94, with a corresponding U-shaped structure 96 that sits atop thereof, with a distal end 96a that is arcuate and shaped to fit the curvature of cylindrical housing 880, thereby forming an enclosed space 93 that can be used to trap therein cables that are, for example, attached to the USB port or to a mouse or to other equipment, so these cables cannot be removed.

FIG. 9c shows the lock 80 with its trap 90 mounted thereon and revealing that the locking wedges 872, 860 protrude therefrom, whereby upon insertion of the locking wedges into the cavity 52, the trap 90 cannot be removed. In FIG. 9c, the arrow 912 indicates the left and right flexible movability of the cable relative to the housing 830 and the arrow 914 indicates that the entire lock construction 80 can be rotated while the locking heads or wedges 872, 860 remain fixed within the cavity 52 as previously described. In the present invention, both locking elements are "wedged" inside the cavity 52. In marked contrast, in the prior art FIGS. 1-3, the T-bar 20 and the pins 26 pass through and are only loosely positioned in the slot 22. They are never "wedged" therein.

Referring to FIGS. 11a, 11b, the instant inventor also describes a miniaturized lock system 110 that is generally similar to the lock system 80 shown in FIG. 8a, but also usable for the conventional security slot 22 that is described relative to prior art FIGS. 1-3. In FIG. 11b, the locking elements comprise scissor heads 1160a, 1160b that can be inserted into the standardized 3×7 mm slot of the prior art, with the key 882 operated to orient the two scissor heads 1160a, 1160b over each other, enabling them to be pushed through the conventional slot 22, or through the opening 52a (FIG. 4) and then moved to the position shown in FIG. 11b, which is the locking position.

The interior components of this lock shown in the exploded view FIG. 11a, with most of the detail omitted because it is identical to the detail shown in FIG. 8a. Here the elements that are not shown are those that have been referred to in FIG. 8a, including the elements 16, 16a, 818, 820, 832, 838, 880 and 882. Similarly included are the elements 840, 844 and 840. The differences comprise that the element 850 of FIG. 8a is now provided as element 1150, comprising a disc head 1150a, and upper and lower arms 1152a, 1152c that are spaced from each other, to provide sufficient spacing to enable the scissor heads 1160a and 1160b to be received therebetween.

The respective coupling holes 1162a, 1162b are aligned with the central opening, through which a riveting pin (not shown) is inserted. The two scissor heads are encased by casing halves 1154a and 1152b that also sit over the coupling 1152b. When assembled inside the housing 830, the turning of the key 882 causes the coupling 1150 to move forward and backward so that the pin passing through grooves 1162a, 1162b will either force the scissor heads to the position shown in FIG. 11b (when the coupler 1150 is pushed further towards the front end of the lock) and to be aligned over each other (when the opposite motion is imparted via the key 882). This is caused by the specific shape of the slots 1162a and 1162b and the effect that they will have when the holding pin slides back and forth through both holes simultaneously. The form and operation of the trap 1190 is identical to the operation of the trap 90 described relative to FIG. 9a, 9b, 9c.

Referring to FIGS. 13a, 13b, 13c and 13d, FIG. 13a illustrates a more elaborate, dual-functionality trap 1390 that includes a trap 1392 with a distal arcuate end 96a, substantially the same as the trap 90 (FIG. 9b) but also including an additional trap 1394 whose function is to lock to the equipment 10 a USB conventional cable 1310 (FIG. 13c) comprising a cable 1316, a sleeve 1318, a body 1319 and insertable USB plug 1320.

Figure 13A:
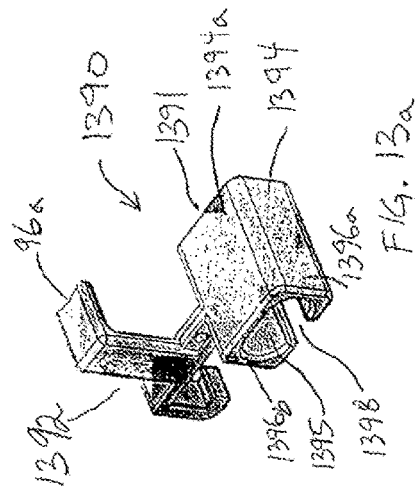
Figure 13B:
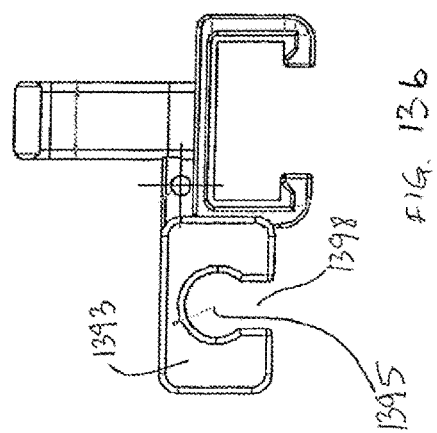
Figure 13C:
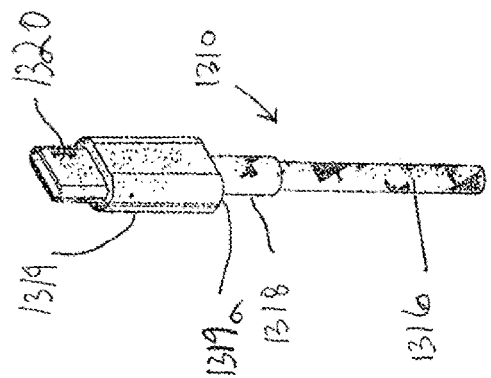
Figure 13D:
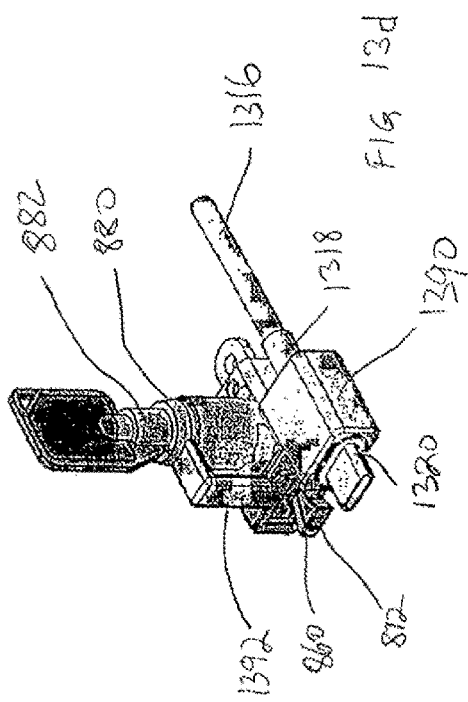

The USB cable trap 1394 has a top wall 1394a, and arcuate sidewalls 1396a, 1396b that leave an open groove 1390a at the bottom, enabling the cable 1316 to slip inside through the groove 1398, with only the USB plug 1320 protruding therefrom as shown in FIG. 13d.

As shown in FIG. 13b, the rear 1391 of the cable trap 1394 has a wall 1393 with a circular opening 1395 that has an interior diameter just slightly larger than the corresponding diameter of the sleeve 1318. Therefore, the sleeve will protrude from the rear of the trap 1390, but the larger sized edge 1390a of the plug body 1319 will catch and rest against the rear wall 1393. Thereby, both the USB plug 1320 and the locking elements 872, 860 can be inserted simultaneously, when the cavity 52 is located adjacent to the USB plug. The overall construction is very beneficial because, not only is the USB cable 1310 unremovable, but the overall structure provides additional sturdiness and prevention of attempts to twist the overall lock mechanism 80 (FIG. 9c).

The trap system of FIG. 13a requires a computer or laptop 10, where the USB port is located close to the security slot or cavity 52. However, some equipment do not provide a security slot at all. To remedy that shortcoming, the instant invention also provides an attachable security slot, in the form of the construction 1410 that comprises essentially a body 1411 that is quite thin, strip shaped and contains several mounting holes 1412. The strip 1410 has a sufficient width, for example more than 10 mm, to form a tab 14 that has enough thickness to form therein the cavity 1452 of the same shape and dimension as the cavity 52 in FIGS. 4-6, with an opening 1454.

This construction 1410 is mounted at the bottom of the piece of equipment 1430 (FIG. 14b) requiring protection, which may be a laptop with a pivotable display 1432, and attached on the bottom thereof with screws 1413, so that the body 1414 with its trapezoidal cavity 1452 are positioned adjacent the USB port 1440. The resilient legs 1434a, 1434b provides sufficient space for the construction 1410. Regardless, when so assembled, the lock with its trap system 1390 can be utilized so that the USB plug 1320 fits in the USB port 1440 while the wedge locking elements 872, 860 are positioned in the locking cavity 1452, as previously described.

Referring to FIG. 15, the general lock system 1580 is similar to the lock body 830 in FIG. 8a, including being provided with a locking cylinder symbolically indicated at 1581. However, in order to provide an even lower to the ground profile, an extra thin, flexible body 1582 is provided and that body is integrally formed with the fixed locking wedge 872 previously described. On the other hand, the moveable wedge bolt 860 is moveable within that extension body 1582, by being connected to a connecting rod 863 that is pivotally connected at 861 and further connected to a thin pulling rod 862 that connects it to the moving mechanism for the moveable wedge 860 as previously described. What is significant here is that the entire construction 1582 has a body thickness 1583 which is approximately 4 mm, whereby it can reach even closer to the surface on which the equipment is resting. The length of the construction 1582 can be about an inch to two inches in length, whereby even a very thin device, e.g. an iPhone®, where the security slot is located within 2 mm of the resting surface can be handled by this locking embodiment.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A lock configured to be attached to electronic equipment requiring securing against theft, at a security cavity of said mobile security equipment, said security cavity being defined by first and second opposed sidewalls, the lock comprising:
a lock body having a housing;
a pair of locking elements protruding from the lock housing and shaped to engage said side walls of said security cavity; said locking elements being configured to be locatable at a height of not more than 3.0 mm above a housing bottom resting surface of said housing;
the pair of locking elements comprising first and second scissor-head locking elements that are pivotably joined, in a manner that allows the scissor-head locking elements to overlap each other in an unlocked position and to spread apart laterally relative to each other in a locked position to lock in said security cavity;
a locking mechanism configured to lock said pair of locking elements within said lock body to prevent withdrawal of the pair of locking elements from the security cavity and
wherein said pair of locking elements are mounted to said housing so as to enable rotation of said housing relative to said pair of locking elements.

2. The lock of claim 1 wherein an interior of said cavity has a three dimensional trapezoidal shape in cross-section and an opening thereinto.

3. The lock of claim 2, wherein said opening into said cavity is rectangular in shape.

4. The lock of claim 1, including a cable attached to said lock body housing.

5. The lock of claim 3, wherein said lock body housing has width, length and height dimensions and the height dimension measures less than 8 mm.

6. The lock of claim 5, wherein said width dimension is less than 12 mm and said length dimension is less than 22 mm.

7. The lock of claim 1, in combination with a portable electronic equipment comprising said cavity.

8. The lock of claim 1, further comprising a locking element base in which said pair of locking elements is anchored, said locking element base having a circular circumferential edge which is rotatably held in a complementary circular groove formed in said lock body for allowing rotation of said locking element relative to said lock body.

9. The lock of claim 1, further including an actuator element configured to move the pair of locking elements between said locked and unlocked positions and said actuator element has a disc head which is rotatably coupled to said sliding mechanism.

10. The lock of claim 7, wherein said cavity is removeably coupled to said portable electronic equipment via a strip that has a construction in which said cavity is formed.

11. The lock of claim 1, including a trap mountable on the housing of said lock body and defining a trap space configured to enable one or more electronic cables to be securely held therein.

12. The lock of claim 1, comprising a first trap mountable on the housing of said lock body and defining a trap space configured to enable one or more electronic cables to be securely held therein, and including a second trap integrally formed with said first trap and configured to attach a USB cable securely to said portable electronic equipment.

13. The lock of claim 1, wherein said first and second scissor-head locking elements are coupled to a coupler which is slidably moveable in the housing and which is mounted in the housing to rotate with the pair of locking elements.

14. The lock of claim 13, wherein the coupler comprises a disc head, and the lock mechanism comprises a slideable coupler with an undercut u-shaped front chamber.

15. The lock of claim 14, wherein the slidable coupler includes a lateral groove and the locking mechanism comprises a lock driver pin that is located in the lateral groove and configured to slide the slidable coupler within the housing in directions toward or away relative to the location of the pair of scissor-head locking elements.

* * * * *